United States Patent [19]
Boivin et al.

[11] Patent Number: 5,466,119
[45] Date of Patent: Nov. 14, 1995

[54] SPACER OF ADJUSTABLE THICKNESS

[75] Inventors: Jean-Claude Boivin, Poisy; Jean-Emile Chollet, Annecy Le Vieux; Pierre Falcoz, Alby Sur Cheran; Luc Mathieu, Annecy Le Vieux, all of France

[73] Assignee: Societe Anonyme Dite: Alcatel Cit, Paris, France

[21] Appl. No.: 231,909

[22] Filed: Apr. 25, 1994

Related U.S. Application Data

[63] Continuation of Ser. No. 970,792, Nov. 3, 1992, abandoned.

[30] Foreign Application Priority Data

Nov. 4, 1991 [FR] France .................... 91 13562

[51] Int. Cl.⁶ .................. F16B 43/00; F04D 29/54; F04D 19/04
[52] U.S. Cl. .................. 415/90; 403/282; 403/274; 29/520; 411/150; 411/313; 384/626
[58] Field of Search .................. 403/351, 366, 403/365, 372, 282, 279, 275, 274; 384/626; 188/201; 411/9–11, 314, 313, 137, 150; 29/515, 520; 415/90

[56] References Cited

U.S. PATENT DOCUMENTS

| | | | |
|---|---|---|---|
| 269,412 | 12/1882 | Heaton | 403/279 X |
| 1,098,974 | 6/1914 | Reilly | 29/520 X |
| 2,010,569 | 8/1935 | Sitzler | 29/520 |
| 2,464,152 | 3/1949 | Ralston | 411/11 |
| 3,405,597 | 10/1968 | Elsner | 411/10 |
| 4,437,784 | 3/1984 | Peterson | 384/626 |
| 4,502,832 | 3/1985 | Becker | 415/90 X |
| 5,052,887 | 10/1991 | Novikov et al. | 415/90 |
| 5,195,756 | 3/1993 | Wachter | 411/11 |

FOREIGN PATENT DOCUMENTS

| | | | |
|---|---|---|---|
| 57912 | 9/1953 | France | 411/150 |
| 63547 | 5/1977 | Japan | 411/11 |
| 870946 | 6/1961 | United Kingdom | 411/10 |

*Primary Examiner*—Anthony Knight
*Attorney, Agent, or Firm*—Sughrue, Mion, Zinn, Macpeak & Seas

[57] ABSTRACT

A stack of parts, such as the stator disks of a turbomolecular pump, the parts being stacked alternately with spacers, includes a spacer having a knife-shaped deformable portion. When the stack is installed for the first time, the portion is compressed so as to take up the tolerances of the stack between abutment surfaces, e.g. delimited by a pump body and a corresponding casing. The invention applies in particular to turbomolecular pumps and aims to eliminate the operations of adjustment, re-machining, or matching that are usually required when installing a stator assembly.

3 Claims, 2 Drawing Sheets

SPACER OF ADJUSTABLE THICKNESS

This is a continuation of application Ser. No. 07/970,792, filed Nov. 3, 1992, now abandoned.

The present invention relates to a spacer of adjustable thickness designed to constitute a component of a stack of elements between two abutment surfaces of two parts that are to be assembled together, said abutment surfaces being at a determined distance apart.

BACKGROUND OF THE INVENTION

Such stacks are used in many fields of application, e.g. in the construction of stators for turbomolecular pumps, in which starors a stator assembly comprises an alternating stack of stator disks and of spacers, the assembly being disposed between respective abutment surfaces of a pump body and of a casing fixed thereon.

Because of the dimensional tolerances of the parts to be stacked and assembled together, it is currently necessary to adjust, to re-machine, or to match parts during installation. All those procedures are costly and inconvenient.

SUMMARY OF THE INVENTION

An object of the invention is to remedy the drawbacks of the means used or considered up until now for manufacturing such assemblies, and the invention provides a spacer of adjustable thickness, wherein the spacer includes a deformable portion suitable for being plastically deformed in the stacking direction under the effect of the stack being installed for the first time between said parts to be assembled together.

Given the dimensional tolerances of the assembly in the stacking direction, the dimensions of the deformable portion are such that, before the stack is installed between the parts to be assembled together, the overall height of the stack is greater than the effective distance between said abutment surfaces, so that deforming said portion of the spacer enables said dimensional tolerances to be taken up. The dimensions of the deformable portion are also such that the degree to which it is compressed is minimal, with the portion remaining in the elastic range, so that it acts as a spring washer for keeping the stack tight.

Preferably, at least the deformable portion of the spacer is made of a soft or resilient material whose cross-section in the stacking direction is knife-shaped. The knife-shape may extend in the stacking direction, or may slope relative thereto.

BRIEF DESCRIPTION OF THE DRAWINGS

Embodiments of the invention are described by way of example with reference to the accompanying drawings, in which.

DETAILED DESCRIPTION

Figure 1:
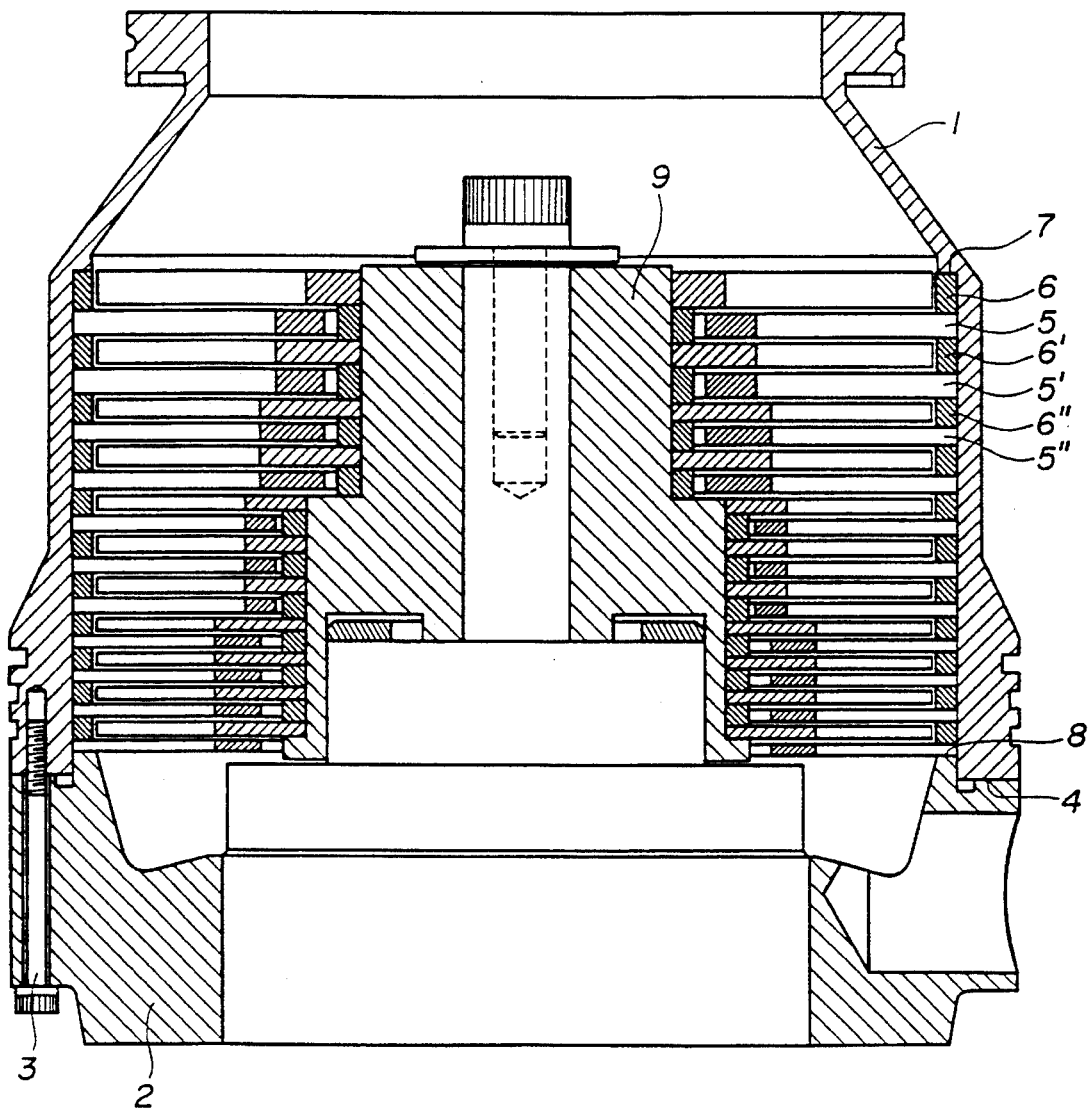
FIG. 1 is a view in axial section through a pumping unit of a turbomolecular pump, the invention being applicable to the stator therein.

The diagram in FIG. 1 shows a casing 1 of a pumping unit, which casing is installed and fixed on a pump body 2 by means of screws, such as 3, the contact surface between the two parts being referenced 4.

An assembly comprising a plurality of elements, such as stator disks 5, 5', 5", etc. stacked alternately with spacers 6, 6', 6", etc. is disposed between abutment surfaces 7 & 8 which are at a determined fixed distance apart. The abutment surfaces 7 & 8 are respectively part of the casing 1 and part of the pump 2. Reference 9 designates a rotor assembly of the pumping unit.

In order for the stack comprising the stator disks and the spacers to be both accurately fitted between the abutment surfaces 7 & 8, and also held mechanically to prevent it from rotating or moving in translation, the height of the stack must correspond almost exactly to the distance between the abutment surfaces. Given the sum of the dimensional tolerances of all the parts present, it is currently almost always necessary to adjust the top spacer 6 or to re-machine that part. Other theoretically possible techniques, such as matching the stator disks and the casing, pose problems for after-sales service or are even more costly, e.g. re-machining the casing or the pump body. In practice, the installation team therefore currently has a set of top spacers 6 of different thicknesses, and determines the appropriate spacer during final installation.

Figure 2:
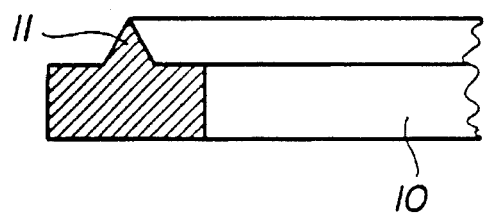
FIG. 2 is a section view of a spacer in a first embodiment of the invention.
Figure 3:
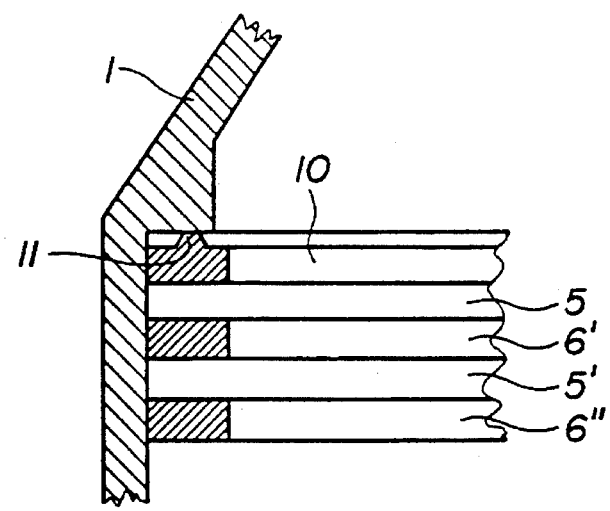
FIG. 3 is a section view of a detail of an assembly using the FIG. 2 spacer.

In the invention, the spacer 6 or one of the other spacers 6', 6", etc. is replaced by a one-piece spacer 10 having a cross-section such as that shown in FIG. 2, for example. Such a spacer 10 includes a knife-shaped portion 11 projecting in the stacking direction. The spacer is made of a soft material, or a resilient material in the embodiment shown in FIG. 4, so that the portion 11 is compressed when the assembly is installed for the first time, as shown in FIG. 3. The stack therefore fits very accurately without any adjustment being necessary. Once the knife-shaped portion has been deformed plastically, the stack of assembled parts can be both removed and re-installed without any inconvenience because the spacer 10 has been reduced to the adjustment setting. Moreover, by using reversible elastic deformation, the stack of stator disks and spacers is held by the spring effect.

The dimensions, and in particular the height of the deformable portion 11 of the spacer 10, are chosen so as to make it possible to take up the maximum difference in the tolerances of the stack of stator disks and spacers.

Figure 4:
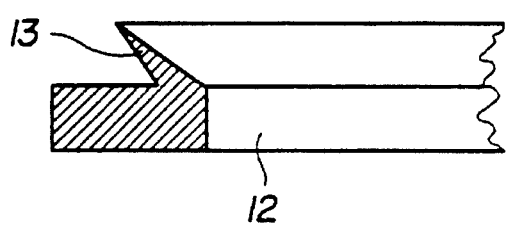
FIG. 4 is a section view of a second embodiment of a deformable spacer.
Figure 5:
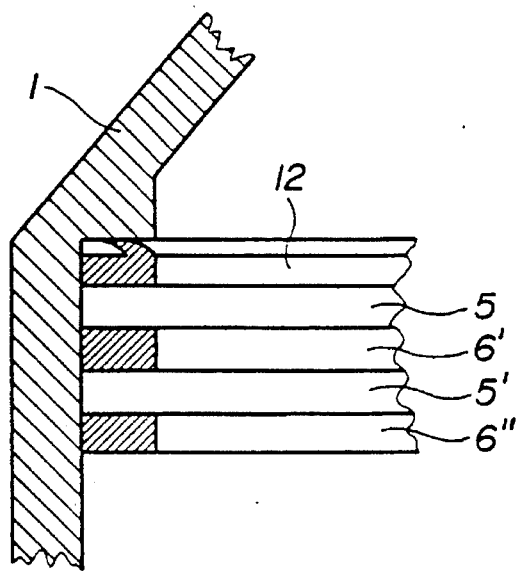
FIG. 5 is a section view of a detail of an assembly using the FIG. 4 spacer.

FIG. 4 shows a variant embodiment 12 of such a spacer. A deformable portion 13 of the spacer is knife-shaped and slopes relative to the stacking direction. FIG. 5 shows a section through such a spacer after it has been plastically deformed.

We claim:

1. A one-piece spacer of adjustable thickness for constituting a component of a stack of elements (5, 5', 5", 6', 6") between two abutment surfaces (7, 8) of two parts (1, 2) that are to be assembled together, said abutment surfaces (7, 8) being at a fixed distance apart, said spacer (10, 12) including a deformable portion (11, 13) capable of being plastically deformed in the stacking direction, the dimensions of the deformable portion (11, 13) being such that, before the stack is installed between the two parts (1, 2) to be assembled together, the overall height of the stack is greater than said fixed distance between said abutment surfaces, whereby the deforming of said portion of the spacer (10, 12) enables the dimensional tolerances to be taken up while accurately fitting the stack of elements between said abutment surfaces (7, 8) and mechanically preventing the stack from rotating or moving in translation;

wherein said two parts are, respectively, a casing (1) of a pump unit, and a pump body (2), and wherein said elements comprise stator disks (5, 5', 5") of a stator of the pump unit, and non-adjustable spacers between adjacent disks.

2. A spacer of adjustable thickness for constituting a component of a stack of elements (5, 5', 5", 6', 6") between two opposed abutment surfaces (7, 8) of two parts (1, 2) that are to be assembled together, said abutment surfaces (7, 8) being at a fixed distance apart, said spacer (10, 12) including a deformable portion (11, 13) capable of being plastically deformed in the stacking direction under the effect of the stack being installed for a first time between said parts to be assembled together, and wherein at least the deformable portion of the spacer is made of a material that is substantially softer than the materials of the parts to be assembled, and whose cross-section in the stacking direction is knife-shaped;

wherein said two parts are, respectively, a casing (1) of a pump unit, and a pump body (2), and wherein said elements comprise stator disks (5, 5', 5") of a stator of the pump unit, and non-adjustable spacers between adjacent disks.

3. A spacer of adjustable thickness for constituting a component of a stack of elements (5, 5', 5", 6', 6") between two abutment surfaces (7, 8) of two parts (1, 2) that are to be assembled together, said abutment surfaces (7, 8) being at a fixed distance apart, said spacer (10, 12) including a deformable portion (11, 13) capable of being plastically deformed in the stacking direction, the dimensions of the deformable portion (11, 13) being such that, before the stack is installed between the two parts (1, 2) to be assembled together, the overall height of the stack is greater than the fixed distance between said abutment surfaces, whereby the deforming of said portion of the spacer (10, 12) enables the dimensional tolerances to be taken up while accurately fitting the stack of elements between said abutment surfaces (7, 8) and mechanically preventing the stack from rotating or moving in translation;

wherein at least the deformable portion (11, 13) of the spacer (10, 12) is made of a material that is substantially softer than the materials of said parts to be assembled, and whose cross-section in the stacking direction is knife-shaped;

wherein said two parts are, respectively, a casing (1) of a pump unit, and a pump body (2), and wherein said elements comprise stator disks (5, 5', 5") of a stator of the pump unit, and non-adjustable spacers between adjacent disks.

\* \* \* \* \*